US008060401B2

(12) United States Patent (10) Patent No.: US 8,060,401 B2
Ingman et al. (45) Date of Patent: Nov. 15, 2011

(54) METHODS, SYSTEMS, AND COMPUTER-READABLE MEDIA FOR PROVIDING AN INDICATION OF A SCHEDULE CONFLICT

(75) Inventors: Robert Ingman, Peachtree City, GA (US); Robert Cole, Birmingham, AL (US); Richard Miller, Hoover, AL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1053 days.

(21) Appl. No.: 11/779,027

(22) Filed: Jul. 17, 2007

(65) Prior Publication Data

US 2009/0024999 A1 Jan. 22, 2009

(51) Int. Cl.
*G07B 15/00* (2006.01)
*G06G 1/12* (2006.01)
(52) U.S. Cl. ............................................. 705/13; 705/21
(58) Field of Classification Search .................. 705/8–9, 705/7.11–7.29
See application file for complete search history.

(56) References Cited

U.S. PATENT DOCUMENTS

| 4,509,123 | A | 4/1985 | Vereen |
| 4,937,743 | A | 6/1990 | Rassman et al. |
| 5,155,689 | A | 10/1992 | Wortham |
| 5,214,281 | A | 5/1993 | Rowe |
| 5,467,268 | A | 11/1995 | Sisley et al. |
| 5,515,510 | A | 5/1996 | Kikinis |
| 5,542,088 | A | 7/1996 | Jennings, Jr. et al. |
| 5,590,269 | A | 12/1996 | Kruse et al. |
| 5,615,121 | A | 3/1997 | Babayev et al. |
| 5,623,404 | A | 4/1997 | Collins et al. |
| 5,751,450 | A | 5/1998 | Robinson |
| 5,757,290 | A | 5/1998 | Watanabe et al. |
| 5,758,264 | A | 5/1998 | Bonta et al. |
| 5,778,345 | A | 7/1998 | McCartney |
| 5,920,846 | A | 7/1999 | Storch et al. |
| 5,943,652 | A | 8/1999 | Sisley et al. |
| 5,963,911 | A | 10/1999 | Walker et al. |
| 5,987,377 | A * | 11/1999 | Westerlage et al. ........... 701/204 |
| 6,006,171 | A | 12/1999 | Vines et al. |
| 6,078,255 | A | 6/2000 | Dividock et al. |

(Continued)

FOREIGN PATENT DOCUMENTS

EP 1139247 10/2001

OTHER PUBLICATIONS

U.S. Official Action dated Aug. 23, 2010 in U.S. Appl. No. 11/778,919.

(Continued)

*Primary Examiner* — Shannon Campbell
*Assistant Examiner* — Tonya Joseph
(74) *Attorney, Agent, or Firm* — Hope Baldauff Hartman, LLC (57) ABSTRACT

Methods, systems, and computer-readable media provide for providing an indication of a schedule conflict. According to embodiments, a method for providing an indication of a schedule conflict is provided. According to the method, whether one of a plurality of technicians is scheduled but not dispatched or dispatched but not scheduled is determined. In response to determining that the one of the plurality of technicians is scheduled but not dispatched or dispatched but not scheduled, an indication that the one of the plurality of technicians is scheduled but not dispatched or dispatched but not scheduled is provided.

11 Claims, 6 Drawing Sheets

U.S. PATENT DOCUMENTS

| | | | |
|---|---|---|---|
| 6,134,530 A | 10/2000 | Bunting et al. | |
| 6,415,259 B1 | 7/2002 | Wolfinger et al. | |
| 6,445,968 B1 | 9/2002 | Jalla | |
| 6,578,005 B1 | 6/2003 | Lesaint et al. | |
| 6,633,900 B1 | 10/2003 | Khalessi et al. | |
| 6,684,136 B2 | 1/2004 | Sinex | |
| 6,889,196 B1 | 5/2005 | Clark | |
| 6,904,408 B1 | 6/2005 | McCarthy et al. | |
| 6,934,379 B2 | 8/2005 | Falcon et al. | |
| 6,941,514 B2 | 9/2005 | Bradford | |
| 6,990,458 B2 * | 1/2006 | Harrison et al. | 705/8 |
| 7,065,456 B1 | 6/2006 | Butka et al. | |
| 7,085,280 B2 | 8/2006 | Martin, IV | |
| 7,127,412 B2 | 10/2006 | Powell et al. | |
| 7,171,375 B2 | 1/2007 | Clarke | |
| 7,222,082 B1 | 5/2007 | Adhikari et al. | |
| 7,283,971 B1 | 10/2007 | Levine et al. | |
| 7,634,431 B2 | 12/2009 | Stratton | |
| 7,640,196 B2 | 12/2009 | Weiss | |
| 7,725,857 B2 | 5/2010 | Foltz et al. | |
| 7,729,939 B2 | 6/2010 | Richardson et al. | |
| 2001/0032103 A1 | 10/2001 | Sinex | |
| 2001/0037229 A1 | 11/2001 | Jacobs et al. | |
| 2001/0049619 A1 | 12/2001 | Powell et al. | |
| 2002/0015064 A1 | 2/2002 | Robotham et al. | |
| 2002/0029161 A1 | 3/2002 | Brodersen et al. | |
| 2002/0040313 A1 * | 4/2002 | Hunter et al. | |
| 2002/0065700 A1 | 5/2002 | Powell et al. | |
| 2002/0069018 A1 * | 6/2002 | Brueckner et al. | |
| 2002/0069235 A1 | 6/2002 | Chen | |
| 2002/0076031 A1 | 6/2002 | Falcon et al. | |
| 2002/0125998 A1 | 9/2002 | Petite et al. | |
| 2002/0143469 A1 | 10/2002 | Alexander et al. | |
| 2002/0152290 A1 * | 10/2002 | Ritche | |
| 2003/0061068 A1 | 3/2003 | Curtis | |
| 2003/0069797 A1 * | 4/2003 | Harrison | |
| 2003/0088492 A1 | 5/2003 | Damschroder | |
| 2003/0120538 A1 | 6/2003 | Boerke et al. | |
| 2003/0139955 A1 | 7/2003 | Kirii et al. | |
| 2003/0149598 A1 | 8/2003 | Santoso et al. | |
| 2003/0152045 A1 | 8/2003 | Martin, IV | |
| 2003/0167238 A1 | 9/2003 | Zeif | |
| 2003/0182052 A1 | 9/2003 | DeLorme et al. | |
| 2003/0187710 A1 * | 10/2003 | Baumer et al. | |
| 2003/0216957 A1 | 11/2003 | Florence et al. | |
| 2003/0233278 A1 * | 12/2003 | Marshall | |
| 2004/0019542 A1 | 1/2004 | Fuchs et al. | |
| 2004/0064436 A1 | 4/2004 | Breslin et al. | |
| 2004/0111311 A1 | 6/2004 | Ingman et al. | 705/9 |
| 2004/0111312 A1 | 6/2004 | Ingman et al. | 705/9 |
| 2004/0111313 A1 | 6/2004 | Ingman et al. | 705/9 |
| 2004/0111634 A1 | 6/2004 | Ingman et al. | 713/201 |
| 2004/0204969 A1 | 10/2004 | Wu | |
| 2004/0249743 A1 | 12/2004 | Virginas et al. | |
| 2005/0015504 A1 | 1/2005 | Dorne et al. | |
| 2005/0043986 A1 | 2/2005 | McConnell et al. | |
| 2005/0119930 A1 | 6/2005 | Simon | |
| 2005/0131943 A1 | 6/2005 | Lewis et al. | |
| 2005/0144058 A1 | 6/2005 | Luo | |
| 2005/0171877 A1 | 8/2005 | Weiss | |
| 2005/0228725 A1 | 10/2005 | Rao et al. | |
| 2006/0015393 A1 | 1/2006 | Eisma et al. | |
| 2006/0031110 A1 | 2/2006 | Benbassat et al. | |
| 2006/0050854 A1 | 3/2006 | Beamon | |
| 2006/0053035 A1 | 3/2006 | Eisenberg | |
| 2006/0064305 A1 | 3/2006 | Alonso | |
| 2006/0064338 A1 * | 3/2006 | Brotman et al. | |
| 2006/0090160 A1 | 4/2006 | Forsythe et al. | |
| 2006/0111957 A1 | 5/2006 | Carmi et al. | |
| 2006/0150077 A1 | 7/2006 | Sheldon et al. | |
| 2006/0182527 A1 | 8/2006 | Ranstrom et al. | |
| 2006/0213817 A1 | 9/2006 | Scott et al. | |
| 2006/0235739 A1 | 10/2006 | Levis et al. | |
| 2007/0078988 A1 | 4/2007 | Miloushev et al. | |
| 2007/0087756 A1 | 4/2007 | Hoffberg | |
| 2007/0174101 A1 * | 7/2007 | Li et al. | |
| 2007/0179830 A1 * | 8/2007 | Iknoian | 705/9 |
| 2007/0211881 A1 | 9/2007 | Parker-Stephen | |
| 2007/0219842 A1 * | 9/2007 | Bansal et al. | 705/9 |
| 2007/0226090 A1 | 9/2007 | Stratton | |
| 2007/0282654 A1 | 12/2007 | Sarkar | |
| 2008/0016436 A1 | 1/2008 | Liu et al. | |
| 2008/0046803 A1 | 2/2008 | Beauchamp et al. | |
| 2008/0065456 A1 | 3/2008 | Labedz et al. | |
| 2008/0140597 A1 * | 6/2008 | Satir et al. | |
| 2008/0162242 A1 * | 7/2008 | Schneur et al. | |
| 2008/0172242 A1 | 7/2008 | Hyatt | |
| 2008/0263491 A1 | 10/2008 | Foltz et al. | |
| 2009/0020297 A1 | 1/2009 | Ingman et al. | |
| 2009/0024431 A1 | 1/2009 | Ingman et al. | |
| 2009/0024435 A1 | 1/2009 | Ingman et al. | |
| 2009/0024436 A1 | 1/2009 | Ingman et al. | |
| 2009/0024437 A1 | 1/2009 | Ingman et al. | |
| 2009/0024438 A1 | 1/2009 | Ingman et al. | |
| 2009/0024455 A1 | 1/2009 | Ingman et al. | |
| 2009/0024646 A1 | 1/2009 | Ingman et al. | |
| 2009/0024957 A1 | 1/2009 | Ingman et al. | |

OTHER PUBLICATIONS

U.S. Official Action dated Aug. 26, 2010 in U.S. Appl. No. 11/778,962.

U.S. Official Action dated Sep. 24, 2010, in U.S. Appl. No. 11/778,999.

U.S. Official Action dated Oct. 13, 2010 in U.S. Appl. No. 11/778,953.

U.S. Official Action dated Oct. 27, 2010 in U.S. Appl. No. 11/779,087.

U.S. Official Action dated Nov. 16, 2010 in U.S. Appl. No. 11/779,054.

"MDSI Mobile Data Solutions—Innovative and effective mobile workforce management and wireless connection", 1998, www.mdsi-advantex.com, pp. 1-31.

Lesaint et al., "Engineering Dynamic Scheduler for Work Manager", Jul. 1998, BT Technol J, 16(3):16-29.

U.S. Official Action dated Nov. 24, 2010 in U.S. Appl. No. 11/779,011.

U.S. Official Action dated Dec. 9, 2010 in U.S. Appl. No. 11/778,919.

U.S. Official Action dated Jan. 25, 2011 in U.S. Appl. No. 11/778,962.

Dimitri Golenko-Ginzburg, Zilla Simuany-Stern, Valdimir Kats, "A Multilevel Decision-Making System with Multipleresources for Controlling Cotton Harvesting" Int. J. Production Economics 46-47 (1996) pp. 55-63.

Xu et al., Effective Heuristic Procedures for a Field Technician Scheduling Problem (2001) Kluwer Academic Publishers, p. 495-509.

U.S. Official Action dated Mar. 24, 2011 in U.S. Appl. No. 11/778,953.

U.S. Official Action dated Feb. 1, 2011 in U.S. Appl. No. 11/779,073.

U.S. Notice of Allowance dated Mar. 24, 2011 in U.S. Appl. No. 11/779,087.

U.S. Notice of Allowance dated May 3, 2011 in U.S. Appl. No. 11/778,999.

U.S. Office Action dated May 11, 2011 in U.S. Appl. No. 11/779,011.

U.S. Notice of Allowance dated May 12, 2011 in U.S. Appl. No. 11/779,054.

U.S. Notice of Allowance dated Aug. 24, 2011 in U.S. Appl. No. 11/779,054.

U.S. Official Action dated Aug. 25, 2011 in U.S. Appl. No. 11/778,919.

* cited by examiner

METHODS, SYSTEMS, AND COMPUTER-READABLE MEDIA FOR PROVIDING AN INDICATION OF A SCHEDULE CONFLICT

CROSS-REFERENCE TO RELATED APPLICATIONS

The present application is related to commonly assigned U.S. patent application Ser. No. 11/778,953, filed concurrently herewith, titled "METHODS, SYSTEMS, AND COMPUTER-READABLE MEDIA FOR DETERMINING A PLURALITY OF TURFS FROM WHERE TO REALLOCATE A WORKFORCE TO A GIVEN TURF,"; commonly assigned U.S. patent application Ser. No. 11/778,999, filed concurrently herewith, titled "METHODS, SYSTEMS, AND COMPUTER-READABLE MEDIA FOR GENERATING A REPORT INDICATING JOB AVAILABILITY,"; commonly assigned U.S. patent application Ser. No. 11/779,054, filed concurrently herewith, titled "METHODS, SYSTEMS, AND COMPUTER-READABLE MEDIA FOR PROVIDING AN INDICATION OF HIGHTIME,"; commonly assigned U.S. patent application Ser. No. 11/779,087, filed concurrently herewith, titled "METHODS, SYSTEMS, AND COMPUTER-READABLE MEDIA FOR PROVIDING FUTURE JOB INFORMATION,"; commonly assigned U.S. patent application Ser. No. 11/778,867, filed concurrently herewith, titled "METHODS, SYSTEMS, AND COMPUTER-READABLE MEDIA FOR PROVIDING NOTIFICATION OF A LAST JOB DISPATCH," with attorney docket number 070008; commonly assigned U.S. patent application Ser. No. 11/778,919, filed concurrently herewith, titled "METHODS, SYSTEMS, AND COMPUTER-READABLE MEDIA FOR PROVIDING COMMITMENTS INFORMATION RELATIVE TO A TURF,"; commonly assigned U.S. patent application Ser. No. 11/778,962, filed concurrently herewith, titled "METHODS, SYSTEMS, AND COMPUTER-READABLE MEDIA FOR PROVIDING CONTACT INFORMATION AT TURF LEVEL,"; commonly assigned U.S. patent application Ser. No. 11/779,011, filed concurrently herewith, titled "METHODS, SYSTEMS, AND COMPUTER-READABLE MEDIA FOR PROVIDING A RATIO OF TASKS PER TECHNICIAN,"; and commonly assigned U.S. patent application Ser. No. 11/779,073, filed concurrently herewith, titled "METHODS, SYSTEMS, AND COMPUTER-READABLE MEDIA FOR PROVIDING WORKFORCE TO LOAD INFORMATION,"; each of which is hereby incorporated herein by reference.

TECHNICAL FIELD

This application relates generally to the field of load balancing. More specifically, the disclosure provided herein relates to the field of dynamic workforce reallocation.

BACKGROUND

Telecommunications networks may provide a number of services, such as plain old telephone service ("POTS"), digital subscriber line ("DSL"), and cable. A telecommunications network may be divided into a plurality of geographic areas known as turfs. Maintenance of the telecommunications network generally involves a proper reallocation of technicians across the turfs such that work orders can be timely filled. For example, when one turf experiences a high volume of work orders, it may be desirable to reallocate available technicians from another, preferably nearby, turf with a low volume of work orders to help with the high volume. The reallocation of technicians may be based on a number of factors, such as the location, skills, schedule, and availability of the technicians, as well as the priority of the work orders and the amount of time to complete the work orders.

Prior to a work shift, a technician is generally assigned a work list (i.e., a work schedule), which contains the job information for a number of jobs to be completed during the work shift. When the technician expects to be unavailable to work (e.g., if the technician plans to take a vacation), the technician may inform scheduling personnel responsible for creating the work list. The work list in the Integrated Dispatch System ("IDS") may be created manually by personnel or automatically via an automated process. After the technician informs the scheduling personnel, the scheduling personnel should update a computer responsible for creating the work list for the technician such that the computer does not create the work list for the technician while the technician is unavailable. Potential difficulties may arise, however, if the scheduling personnel does not properly update the computer or if the technician does not properly inform the scheduling personnel. In particular, a work list allocating a number of jobs to the technician may still be created even though the technician is unavailable. The jobs allocated to the technician may be uncompleted unless a load balance supervisor ("LBS") or other personnel responsible for dispatching technicians reschedules the jobs to other technicians. The LBS may not be aware that the technician is unavailable, however, until a significant amount of time passes in the technician's scheduled work shift. As such, a number of appointments for jobs may be missed, and too much time may pass to reschedule the missed jobs.

The opposite scenario to the one described above may also occur and cause its own difficulties. As briefly described above, when a technician is not scheduled for a work shift, the technician may not be assigned a work list. However, if a technician still arrives to work and requests to be dispatched to jobs, a significant amount of unproductive time may be wasted by the technician waiting for a next job to be assigned.

SUMMARY

Embodiments of the disclosure presented herein include methods, systems, and computer-readable media for providing an indication of a schedule conflict. According to one aspect, a method for providing an indication of a schedule conflict is provided. According to the method, whether one of a plurality of technicians is scheduled but not dispatched or dispatched but not scheduled is determined. In response to determining that the one of the plurality of technicians is scheduled but not dispatched or dispatched but not scheduled, an indication that the one of the plurality of technicians is scheduled but not dispatched or dispatched but not scheduled is provided.

According to another aspect, a system for providing an indication of a schedule conflict is provided. The system includes a memory and a processor functionally coupled to the memory. The memory stores a program containing code for providing an indication of a schedule conflict. The processor is responsive to computer-executable instructions contained in the program and operative to: determine whether one of a plurality of technicians is scheduled but not dispatched or dispatched but not scheduled, and in response to determining that the one of the plurality of technicians is scheduled but not dispatched or dispatched but not scheduled, provide an indication that the one of the plurality of technicians is scheduled but not dispatched or dispatched but not scheduled.

According to yet another aspect, a computer-readable medium having instructions stored thereon for execution by a processor to perform a method for providing an indication of a schedule conflict is provided. According to the method, whether one of a plurality of technicians is scheduled but not dispatched or dispatched but not scheduled is determined. In response to determining that the one of the plurality of technicians is scheduled but not dispatched or dispatched but not scheduled, an indication that the one of the plurality of technicians is scheduled but not dispatched or dispatched but not scheduled is provided.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 1 is a diagram of an exemplary embodiment of a graphical user interface ("GUI") in a previous version.

FIG. 5 is a diagram of a GUI, in accordance with exemplary embodiments.

DETAILED DESCRIPTION

The following detailed description is directed to methods, systems, and computer-readable media for providing an indication of a schedule conflict. In the following detailed description, references are made to the accompanying drawings that form a part hereof, and which are shown by way of illustration specific embodiments or examples.

As used herein, the terms "work order," "job," and "task" are used interchangeably. Although not so limited, embodiments described herein primarily refer to a "work order" as the maintenance and repair of a telecommunications network by a technician. However, it will be apparent to one of ordinary skill in the art that, in further embodiments, a "work order" may include any suitable service that involves the allocation and reallocation of personnel to perform the service.

Embodiments described herein provide a Next Generation Load Balance ("NGLB") tool for work force reallocation. According to exemplary embodiments, the NGLB tool has a graphical user interface ("GUI"), such as a GUI 400 of FIG. 5, containing an organized overview of work order and technician statuses within a plurality of turfs. The NGLB tool may be utilized by a load balance supervisor ("LBS") or other load balancing personnel to aid in the coordination of work force reallocation within the plurality of turfs. In one embodiment, the NGLB tool is provided to the LBS as a web-based application that can be accessed remotely via, for example, a web browser. In addition, the NGLB tool may be stored on a computing device used by the LBS to balance personnel.

Figure 2:
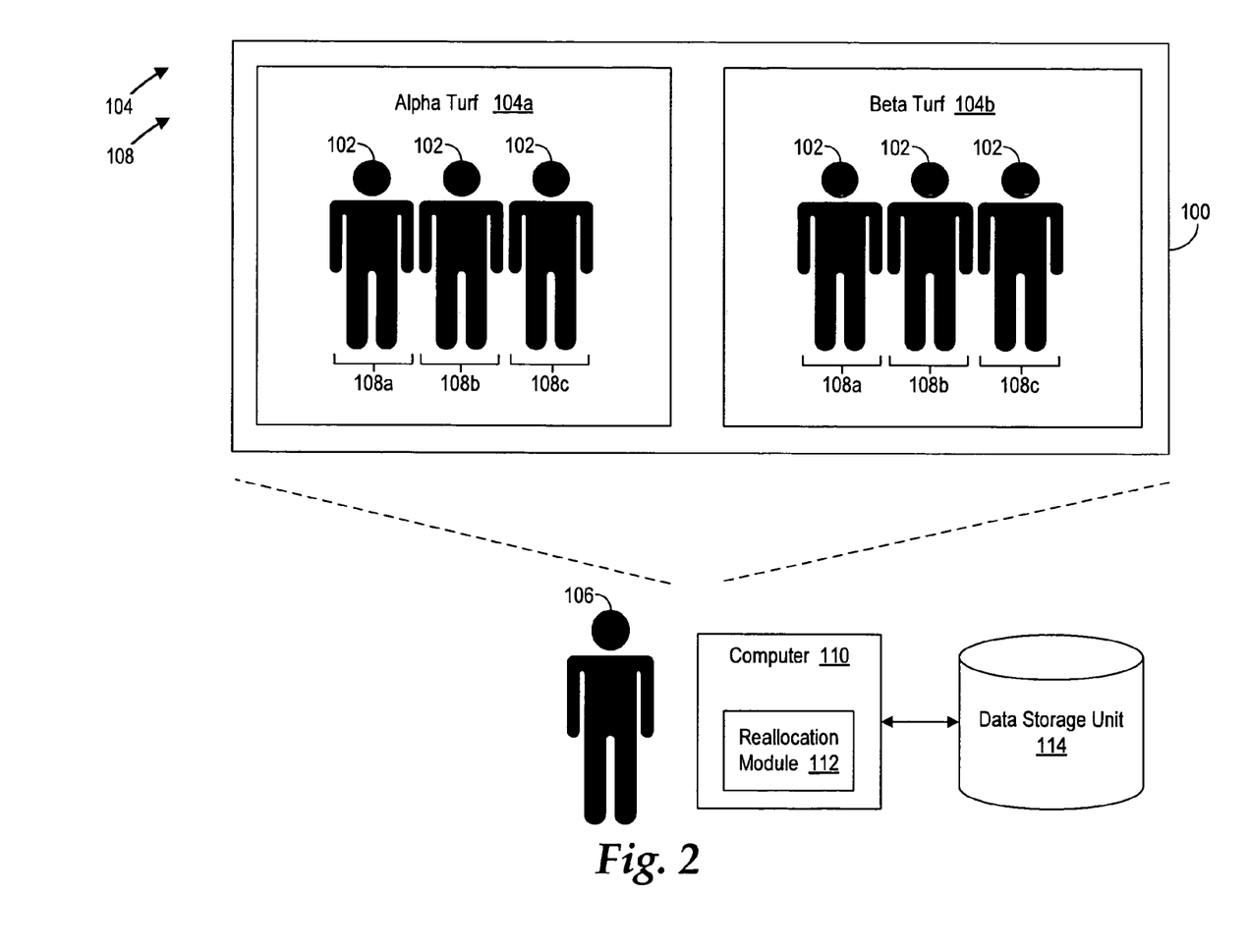
FIG. 2 is a high-level diagram illustrating an allocation of technicians for maintaining and repairing a telecommunications network, in accordance with exemplary embodiments.
Figure 3:
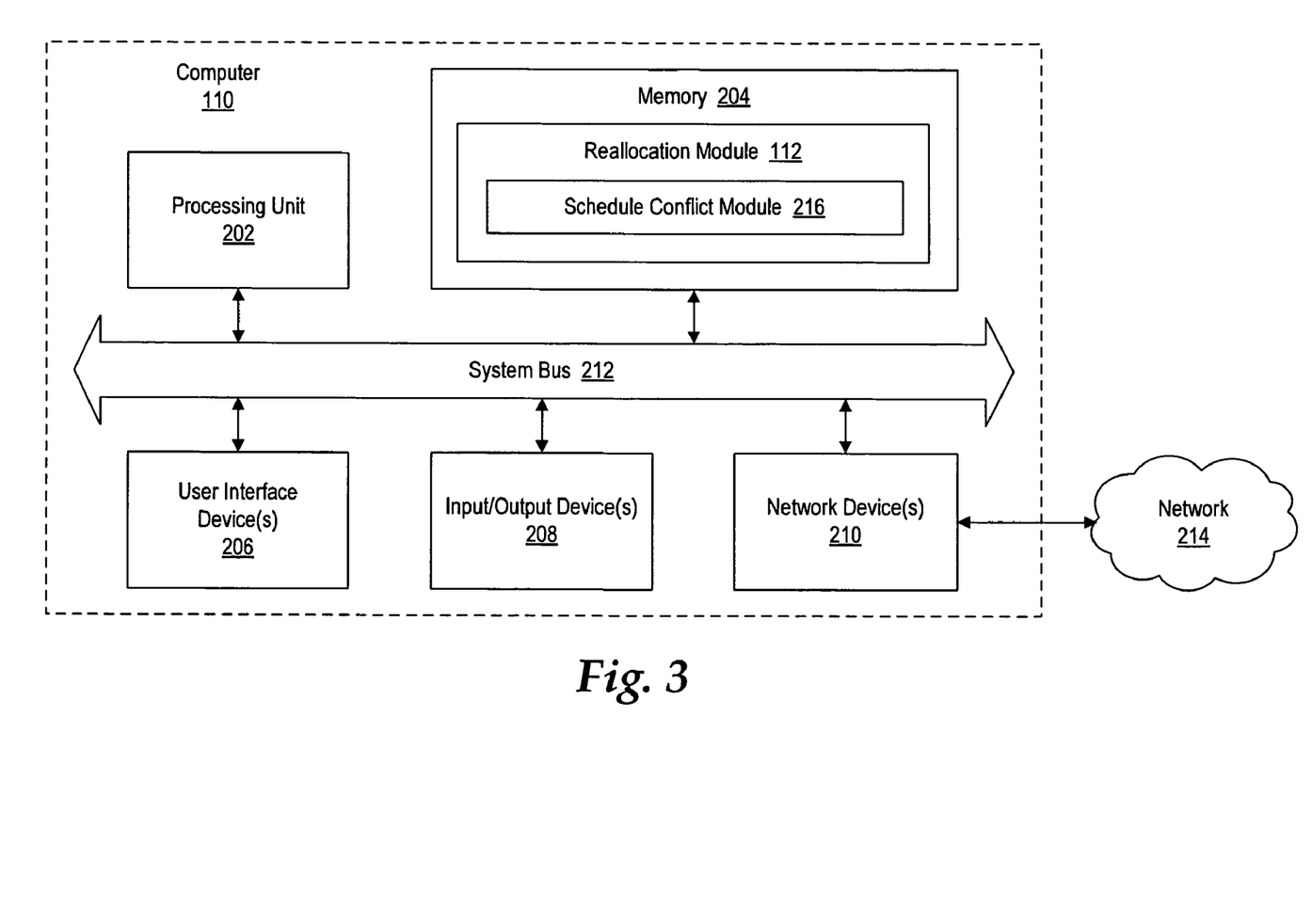
FIG. 3 is a block diagram illustrating a computer configured to provide a GUI that aids in the reallocation of the technicians across a plurality of turfs, in accordance with exemplary embodiments.
Figure 4:
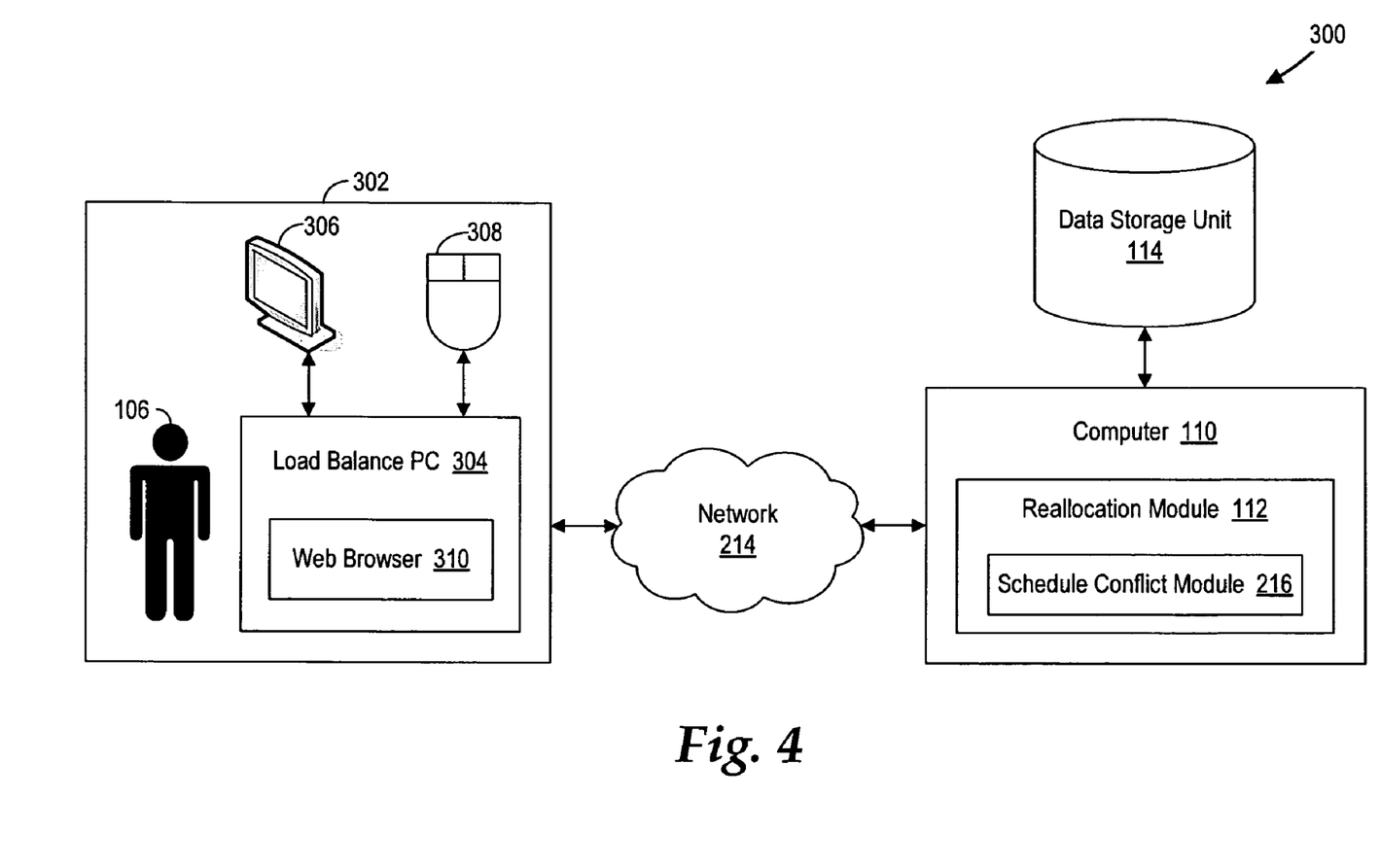
FIG. 4 is a block diagram of a workforce reallocation system, in accordance with exemplary embodiments.

According to further embodiments, the NGLB tool includes a schedule conflict module, such as the schedule conflict module 216 of FIGS. 3 and 4. The schedule conflict module provides information on technicians, such as the technicians 102 of FIG. 2, who are either (1) scheduled to work (i.e., have a work list) but are not dispatched to a next job within a given amount of time, or (2) dispatched to work without having a work list, according to one embodiment. This information is referred herein as schedule conflict information. In each case, the schedule conflict module may provide any suitable schedule conflict information, including, but not limited to, a name of the technician, a status of the technician, a scheduled start time of a work shift for the technician, a scheduled end time of the work shift for the technician, a scheduled start time of a next job, and a schedule conflict status (i.e., scheduled but not dispatched or dispatched but not scheduled). In one embodiment, the schedule conflict module provides the schedule conflict information via a GUI, such as the GUI 400 of FIG. 5. A LBS viewing the GUI may utilize the schedule conflict information to reassign jobs for technicians who are scheduled but not dispatched, to generate a work list for technicians who are dispatched but not scheduled, and to perform any other suitable actions.

Referring now to the drawings, it is to be understood that like numerals represent like elements through the several figures, and that not all components and/or steps described and illustrated with reference to the figures are required for all embodiments. FIG. 1 is an exemplary embodiment of the GUI 10 utilized in a previous version of the NGLB tool implemented by assignee of this application on or about April 2005. As illustrated in FIG. 1, the GUI 10 includes a plurality of turfs, such as turfs 12a, 12b, 12c, 12d. Each of the turfs, such as the turf 12a, includes four columns 14a, 14b, 14c, 14d. Each of the four columns 14a, 14b, 14c, 14d includes a first cell 16a and a second cell 16b. The first cell 16a includes job information and the second cell 16b includes technician information, according to one embodiment. The GUI 10 provides map presentation of the turfs 12a, 12b, 12c, 12d. The map presentation provides a visual mapping of physical distances between each of the plurality of the turfs 12a, 12b, 12c, 12d. In one example, the physical distance between the turf 12a and the turf 12b is a distance 18. In another example, the turf 12c and turf 12d are contiguous as indicated by the turf 12c being in contact with the turf 12d in the GUI 10.

FIGS. 2-6 as described below illustrate a current version of the NGLB tool. FIG. 2 is a high-level diagram illustrating an allocation of the technicians 102 for maintaining and repairing a telecommunications network 100, in accordance with exemplary embodiments. The telecommunications network 100 is maintained and repaired by a plurality of the technicians 102. As illustrated in FIG. 2, each of the technicians 102 is assigned to an Alpha turf 104a or a Beta turf 104b (collectively turfs 104) by a LBS 106 or other load balancing personnel, according to exemplary embodiments. Each turf 104 includes a plain old telephone service ("POTS") bucket 108a, a digital subscriber line ("DSL") bucket 108b, and a cable bucket 108c (collectively buckets 108), according to one embodiment. Each of the buckets 108 represents a discipline in which one or more of the technicians 102 may be assigned based on the skill set of the technician 102. In particular, the technician 102 in the POTS bucket 108a should have a skill set for completing POTS related work orders. The technician 102 in the DSL bucket 108b should have a skill set for completing DSL related work orders, and the technician 102 in the cable bucket 108c should have a skill set for completing cable related work orders. In one embodiment, one or more of the technicians 102 may include multiple skill sets for completing work orders under multiple buckets 108. The technicians 102 may be managed by one or more field supervisors (not shown). For example, the technicians 102 in each bucket 108 may be managed by a separate field supervisor.

For the sake of simplicity and without limitation, only two turfs 104a and 104b and three buckets 108a, 108b, and 108c are illustrated in FIG. 2. However, it will be apparent to those of ordinary skill in the art that the telecommunications network 100 may include any suitable number of turfs 104 and any suitable number and types of buckets 108, according to further embodiments.

The LBS 106 utilizes a computer 110 to aid in reallocating the plurality of technicians 102 across the turfs 104. The computer 110 includes a reallocation module 112, which enables the computer 110 to display a graphical user interface ("GUI"), such as the GUI 400 of FIG. 5, that provides the LBS 106 with an organized, visual presentation of the technicians 102, the turfs 104, and the buckets 108, according to one embodiment. In one example, if work orders in the Alpha turf 104a cannot be timely filled without additional technicians 102, the LBS 106 may view the GUI 400 to determine if the technicians 102 in the Beta turf 104b can be utilized. In a further example, if service orders in the POTS bucket 108a cannot be timely filled without additional technicians 102, the LBS 106 may view the GUI 400 to determine if the technicians 102 in the DSL bucket 108b or the cable bucket 108c are qualified to fill POTS work orders. In one embodiment, the computer 110 functions as a web server located remotely from the LBS 106 by executing a web server application, such as BEA WEBLOGIC SERVER from BEA SYSTEMS. In this embodiment, the LBS 106 may access the GUI 400 over a network, such as a network 214 of FIGS. 3 and 4, using, for example, a local web browser interface on a personal computer ("PC") or other computing device.

In one embodiment, each technician 102 carries a portable computing device (not shown), such as a laptop computer. The portable computing device enables the technician 102 to receive job information out in the field without having to return to a base station, thereby increasing efficiency. The job information may include, for example, the location of the job, the type of work to be done on the job, and the time at which the job is to be done. The technician 102 may access the job information using dispatch software executed on the portable computer device, as is known to those skilled in the art. The dispatch software may include a number of suitable functions for the technician 102 to transmit and receive information related to dispatches. In one embodiment, the dispatch software includes a Get Job function that enables the technician 102 to request a job.

In one embodiment, the reallocation module 112 generates at least a portion of the GUI 400 based on data stored in a data storage unit 114. The data storage unit 114 may store any suitable data related to the technicians 102, such as the location, skills, schedule, and availability of the technicians 102. The data storage unit 114 may be a database. In one embodiment, the data storage unit 114 is an Integrated Dispatch System ("IDS"). The IDS is described in greater detail in U.S. Patent Application Publication No. 2004/0111311, entitled "Turfs and Skills for Multiple Technicians," to Ingman et al.; U.S. Patent Application Publication No. 2004/0111312, entitled "Validating Turfs for Work Orders," to Ingman et al.; U.S. Patent Application Publication No. 2004/0111313, entitled "Methods and Systems for Assigning Multiple Tasks," to Ingman et al.; and U.S. Patent Application Publication No. 2004/0111634, entitled "Security Permissions for an Integrated Dispatch System," to Ingman et al.

FIG. 3 and the following discussion are intended to provide a brief, general description of the computer 110 in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating the computer 110 configured to provide a GUI, such as the GUI 400 of FIG. 5, that aids in the reallocation of the technicians 102 across the turfs 104, in accordance with exemplary embodiments. The computer 110 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. According to exemplary embodiments, the memory 204 includes the reallocation module 112. In one embodiment, the reallocation module 112 is embodied in computer-readable media containing instructions that, when executed by the processing unit 202, generates a GUI, such as the GUI 400 of FIG. 5, containing information related to the reallocation of the technicians 102 across a plurality of the turfs 104, as described in greater detail below. Exemplary information related to the reallocation across a plurality of the turfs 104 includes, but is not limited to, the physical proximity between the technicians 102, the availability of the technicians 102, the physical proximity between the turfs 104, the existing load on each of the turfs 104, and the anticipated load on each of the turfs 104. According to further embodiments, the reallocation module 112 may be embodied in hardware, software, firmware, or any combination thereof.

As illustrated in FIG. 3, the reallocation module 112 includes the schedule conflict module 216. In one embodiment, the schedule conflict module 216 is embodied in computer-readable media containing instructions that, when executed by the processing unit 202, provides an indication of schedule conflict, as described in greater details below. As used herein, the term "schedule conflict" refers to at least one of two possible scenarios. In the first scenario, the technician 102 is scheduled to work (i.e., the technician 102 has been assigned a work list) but is not dispatched to a next job within a given amount of time, for example, at least thirty minutes. The given amount of time may be an estimated amount of time that indicates the technician 102 is unavailable for work. In one embodiment, the technician 102 is considered to be dispatched when the technician 102 utilizes a Get Job function on a portable computing device. In the second scenario, a technician 102 is dispatched to work without having a work list. The second scenario may occur if, for example, the technician 102 is expected to be on vacation but instead decides to work.

In each scenario, the schedule conflict module 216 may provide any suitable schedule conflict information, including, but not limited to, a name of the technician 102, a status of the technician 102, a scheduled start time of a work shift for the technician 102, a scheduled end time of the work shift for the technician 102, a scheduled start time of a next job, and a schedule conflict status (i.e., scheduled but not dispatched or dispatched but not scheduled). According to further embodiments, the schedule conflict module 216 may be embodied in hardware, software, firmware, or any combination thereof. In one embodiment, the schedule conflict module 216 provides the schedule conflict information via a GUI, such as the GUI 400 of FIG. 5. A LBS 106 viewing the GUI, such as the GUI 400, may utilize the schedule conflict information to reassign jobs for the technicians 102 who are scheduled but not dispatched, to generate a work list for the technicians 102 who are dispatched but not scheduled, and to perform any other suitable actions.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 110.

The user interface devices 206 may include one or more devices with which a user accesses the computer 1 10. The user interface devices 206 may include, but are not limited to, computers, servers, personal digital assistants, cellular phones, or any suitable computing devices. In one embodiment, the computer 110 functions as a web server located remotely from the LBS 106 by executing a web server application, such as BEA WEBLOGIC SERVER from BEA SYSTEMS. By enabling the computer 110 to function as a web server, the LBS 106 may access the GUI 400 generated by the computer 110 over a network, such as the network 214, using, for example, a local web browser interface on a PC or other computing device.

According to exemplary embodiments, the I/O devices 208 enable a user to interface with the reallocation module 112. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, and an electronic stylus. Further, the I/O devices 208 may include one or more output devices, such as, but not limited to, a display screen and a printer.

The network devices 210 enable the computer 110 to communicate with other networks or remote systems via the network 214. Examples of the network devices 210 may include, but are not limited to, a modem, a radio frequency ("RF") or infrared ("IR") transceiver, a telephonic interface, a bridge, a router, or a network card. The network 214 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 214 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 4 is a block diagram of a workforce reallocation system 300, in accordance with exemplary embodiments. The workforce reallocation system 300 includes the computer 110, a network dispatch center ("NDC") 302, and the data storage unit 114, each of which is operatively connected to the network 214. The NDC 302 includes a load balance PC 304, which is utilized by the LBS 106, according to one embodiment. In further embodiments, the NDC 302 may include any suitable number of load balance PCs 304 to be utilized by any suitable number of LBSs 106. The data storage unit 114 may store any suitable data regarding the technicians 102, such as their location, skills, schedule, and availability. In one embodiment, the reallocation module 112 retrieves data from the data storage unit 114 to generate a GUI, such as the GUI 400 of FIG. 5. The data storage unit 114 may be a database. In one embodiment, the data storage unit 114 is an IDS.

The load balance PC 304 includes a display 306 and a mouse 308, according to one embodiment. In further embodiments, the load balance PC 304 may include any suitable input/output devices 208. It will be apparent to one having ordinary skill in the art that the load balance PC 304 may be substituted with any suitable computing device, such as a personal digital assistant or a cellular phone. The display 306 may be configured to display the GUI 400 and the schedule conflict information provided by the schedule conflict module 216.

In exemplary embodiments, the load balance PC 304 includes a web browser 310, such as INTERNET EXPLORER from MICROSOFT CORPORATION, for accessing the GUI 400 and for facilitating communications between the LBS 106 and the computer 110. Using the web browser 310, the LBS 106 may access the GUI 400 by inputting a Uniform Resource Locator ("URL") into the web browser 310. The load balance PC 304 may communicate with the computer 110 via Hypertext Transfer Protocol ("HTTP"). As previously described, the computer 110 may function as a web server. In one embodiment, access to the GUI 400 by the load balance PC 304 may be restricted by a login screen requiring, for example, a login identification and a password. In further embodiments, communications between the load balance PC 304 and the computer 110 may be encrypted by any suitable encryption mechanism.

In exemplary embodiments, the computer 110 may communicate with the data storage unit 114 via a Java Database Connectivity ("JDBC") application program interface ("API"). In one embodiment, the computer 110 retrieves data from the data storage unit 114 at regular intervals, such as every two to five minutes. In further embodiments, the computer 110 retrieves data from the data storage unit 114 when requested by the LBS 106. In other embodiments, the reallocation module 112 may be stored on the load balance PC 304 such that the GUI 400 is accessed from the load balance PC 304 and such that the load balance PC communicates with and retrieves data from the data storage unit 1 14.

FIG. 5 is an exemplary embodiment of the GUI 400. In one embodiment, the GUI 400 is generated by the reallocation module 112 of the computer 1 10. The LBS 106 may view the GUI 400 on the display 306 via the web browser 310 in the load balance PC 304. In one embodiment, various portions of the GUI 400 are accessible by an input device, such as the mouse 308. It should be appreciated that the GUI 400 illustrated in FIG. 5 is only an exemplary embodiment. It will be apparent to one having ordinary skill in the art that in other embodiments, the GUI 400 may be displayed differently (e.g., as a map presentation), may omit certain fields, or may include other fields.

According to exemplary embodiments, the GUI 400 includes a plurality of turfs 402, such as a west Opa-locka turf 404. The GUI 400 may further include a plurality of buckets: a POTS bucket 406, a DSL bucket 408, a Cable bucket 410, a Specials bucket 412, and a Non-Demand ("ND") bucket 414. According to exemplary embodiments, each of the buckets 406, 408, 410, 412, 414 includes four columns: an Hours column 416, a Tickets column 418, a Dispatched Technicians (hereinafter referred to as Dispatches) column 420, and a Future Tickets (hereinafter referred to as Futures) column 422. Each of a plurality of cells 424, 432, and 464 may be associated with a column, a bucket, and a turf. For example, the cell 424 is associated with the Hours column 416, the POTS bucket 406, and the west Opa-locka turf 404.

Each of the plurality of turfs 402, such as the west Opa-locka turf 404, may refer to any suitable geographic area. For example, the west Opa-locka turf 404 refers to the western portion of the city of Opa-locka, Florida. As illustrated in FIG. 5, the GUI 400 displays the turfs 402, including the west Opa-locka turf 404, contained in the central Dade assignment group ("AG") 426. In one embodiment, the NDC 302 includes a plurality load balance PCs, such as the PC 304, where each load balance PC corresponds to a different AG, such as the AG 426.

According to exemplary embodiments, the POTS bucket 406 contains information related to POTS related work orders. The DSL bucket 408 contains information related to DSL related work orders. The Cable bucket 410 contains information related cable related work orders. The Specials bucket 412 contains information related to special circuit related work orders, such as Digital Signal 1 ("DS1") and Digital Signal 3 ("DS3"). The ND bucket 414 is a catch-all bucket containing information related to work orders not categorized in the POTS bucket 406, the DSL bucket 408, the Cable bucket 410, or the specials bucket 412.

The Hours column 416 indicates the number of hours of pending and assigned work orders in each of the plurality of turfs 402. As used herein, an assigned work order is defined as a work order that is assigned to a technician, such as the technician 102, and a pending work order is defined as a work order that is not assigned to a technician 102 and is to be completed within the current business day. The tickets column 418 indicates the number of tickets (i.e., work orders) corresponding to the number of hours shown in the Hours column 416 of one of the buckets 406, 408, 410, 412, 414. The Dispatches column 420 indicates the number of technicians 102 dispatched. The Futures column 422 indicates the number of future jobs to be completed by the technicians 102.

The GUI 400 may further include a Regional Maintenance Center ("RMC") column 428, which indicates the RMC number designated to a particular turf. In one embodiment, each RMC number listed under the RMC column 428 may be accessible by an input device, such as the mouse 308. For example, a RMC number may be accessed by hovering a mouse cursor over the RMC number or by clicking the RMC number using the mouse 308. In response to accessing the RMC number, the GUI 400 may display a window, such as a drop-down window, according to one embodiment. The window may include information related to each of the buckets 406, 408, 410, 412 414, such as hours, tickets, and dispatches.

As illustrated in FIG. 5, the GUI 400 may include a schedule conflict column 430, according to one embodiment. The schedule conflict column 430 includes a plurality of cells, such as the cell 432, providing an indication of a number of technicians 102 that have a schedule conflict for a particular turf 402. For example, the cell 432 indicates that two technicians 102 have a schedule conflict for the Opa-locka turf 404. As previously noted, the term "schedule conflict" refers to at least one of two possible scenarios. In the first scenario, a technician 102 is scheduled to work (i.e., the technician 102 has been assigned a work list) but is not dispatched to a next job within a given amount of time, for example, at least thirty minutes. The given amount of time may be an estimated amount of time that indicates the technician 102 is unavailable for work. In the second scenario, a technician 102 is dispatched to work without having a work list. The second scenario may occur if, for example, the technician 102 is expected to be on vacation but instead decides to work.

In one embodiment, each cell, such as the cell 432, in the schedule conflict column 430 is highlighted to easily distinguish between the turfs 402 that have no technicians 102 that have a schedule conflict and the turfs 402 that have at least one technician 102 that has a schedule conflict. For example, the cell 432, which indicates that two technicians 102 have a schedule conflict, may be shaded red, while the cell 464, which indicates that no technicians 102 have a schedule conflict, may be shaded green. The cells, such as the cell 432, in the schedule conflict column 430 may be highlighted using any suitable visual cue, according to further embodiments.

In one embodiment, each cell, such as the cell 432, in the schedule conflict column 430 may be accessed by an input device, such as the mouse 308. For example, the schedule conflict column 430 may be accessed by hovering a mouse cursor over the cell or by clicking the cell using the mouse 308. In response to accessing a cell in the schedule conflict column 430, the GUI 400 may display a window, such as a drop-down window 434, according to exemplary embodiments. The drop-down window 434 is displayed in response to accessing the cell 432. The drop-down window 434 provides schedule conflict information for the west Opa-locka turf 404, which corresponds to the cell 432. In one embodiment, the drop-down window 434 includes a terminate button 466 with which to close the drop-down window 434.

The drop-down window 434 includes a turf column 436, job identification ("ID") column 438, a job type column 440, a technician status column 442, a bucket column 444, a technician ID column 446, a technician name column 448, a scheduled start column 450, a next assigned column 452, a scheduled end column 454, a time zone column 456, and a schedule conflict status 458. Each row 460 and 462 in the drop-down window 434 corresponds to a technician 102. The turf column 436 specifies the turf 402 for which the drop-down window 434 provides schedule conflict information. The job ID column 438 specifies a particular job. The job type column 440 identifies the type of work to be done on the job identified by the job ID column 438. The technician status column 442 indicates whether the job identified by the job ID column 438 has been assigned or is pending. The bucket column 444 specifies a bucket 406, 408, 410, 412, 414 in which the technician 102 identified by the technician ID column 446 and the technician name column 448 is assigned. The technician ID column 446 and the technician name column 448 identify a particular technician 102 assigned to the job identified by the job ID column 438.

According to exemplary embodiments, the scheduled start column 450 specifies the time at which the technician 102 identified by the technician ID column 446 and the technician name column 448 begins a work shift. The scheduled end column 454 specifies the time at which the technician 102 identified by the technician ID column 446 and the technician name column 448 ends the work shift. At the row 460, the scheduled start column 450 specifies 8:00 am and the scheduled end column specifies 4:00 pm. As such, the technician "Patrick Dinneen" (according to the technician name column 448) at row 460 has a work shift from 8:00 am to 4:00 pm. The next assigned column 452 specifies an estimated start time for a next job. At the row 460, the next assigned column 452 specifies that the job identified by the job ID column 438 is estimated to begin at 9:10 am.

In one embodiment, if the technician 102 identified by the technician ID column 446 and the technician name column 448 is not dispatched to the job identified by the job ID column 438 within a threshold time after the estimated start time identified by the next assigned column 452, then the technician 102 identified by the technician ID column 446 and the technician name column 448 is determined to be scheduled but not dispatched. In one embodiment, the technician 102 is considered to be dispatched when the technician 102 utilizes a Get Job function on a portable computing device. If the threshold for determining when a technician 102 is scheduled but not dispatched is, for example, thirty minutes, then the technician "Patrick Dinneen" is determined to be scheduled but not dispatched at 9:40 am (i.e., thirty minutes past the estimated start time of 9:10 am). The threshold time may be any suitable time according to exemplary embodiments.

In one embodiment, the schedule conflict status 458 specifies that the technician 102 identified by the technician ID column 446 and the technician name column 448 is scheduled but not dispatched or dispatched but not scheduled. As illustrated in FIG. 5, at row 460, the technician "Patrick Dinneen" (according to the technician name column 448) is identified as scheduled but not dispatched under the status conflict status 458. Likewise, at row 462, the technician "Stephan Zarzecki" (according to the technician name column 448) is also identified as scheduled but not dispatched under the status conflict status 458. At the rows 460, 462, the schedule conflict status 458 displays "Sched Not Disp" to indicate scheduled but not dispatched for the corresponding technician 102. Alternatively, if either of the technicians 102 in the rows 460, 462 were dispatched but not scheduled, then the corresponding schedule conflict status 458 may display "Disp Not Sched" under the status conflict status 458 instead of "Sched Not Disp," according to further embodiments.

Figure 6:
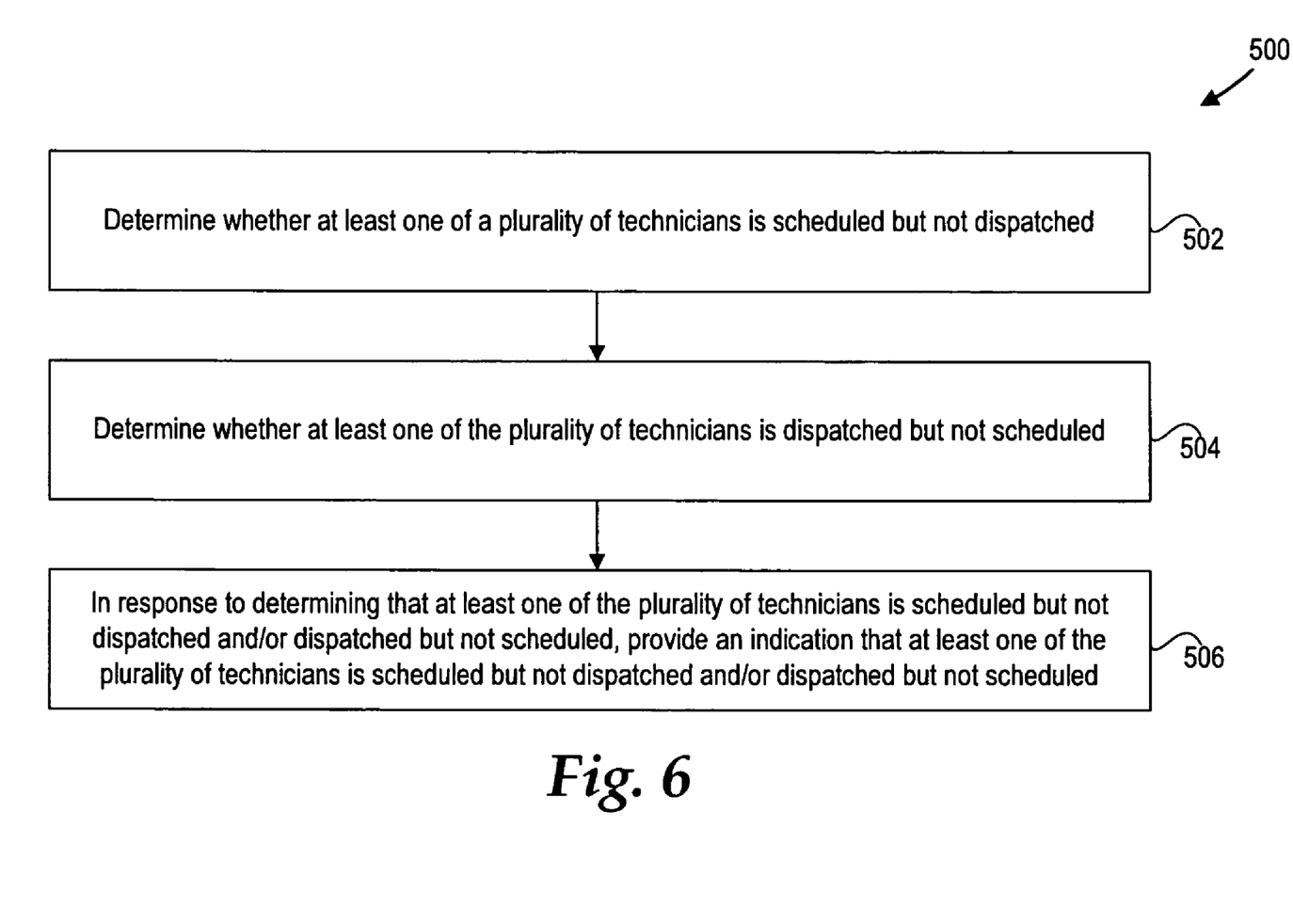
FIG. 6 is a flow diagram illustrating a method for providing an indication of a schedule conflict, in accordance with exemplary embodiments.

FIG. 6 is a flow diagram illustrating a method 500 for providing an indication of a schedule conflict, in accordance with exemplary embodiments. According to the method, the schedule conflict module 216 determines (at 502) whether at least one of a plurality of technicians 102 is scheduled but not dispatched. The schedule conflict module 216 determines (at 504) whether at least one of the plurality of technicians 102 is dispatched but not scheduled. In one embodiment, the schedule conflict module 216 determines whether at least one of the plurality of technicians 102 is scheduled but not dispatched by determining, for each of the plurality of technicians 102, whether a difference between a current time and a time to begin a job is greater than a threshold time, for example, thirty minutes. For those technicians 102 that have a difference greater than the threshold time, then the schedule conflict module 216 may determine those technicians 102 to be scheduled but not dispatched. In one embodiment, the schedule conflict module 216 determines whether at least one of the plurality of technicians 102 is dispatched but not scheduled by obtaining a list identifying all of the scheduled technicians 102 and comparing the list identifying all of the scheduled technicians 102 with a list identifying all of the dispatched technicians 102. The technicians 102 that are on the list identifying all of the dispatched technicians 102 but are not on the list identifying all of the scheduled technicians 102 may be determined to be dispatched but not scheduled.

In response to determining that at least one of the plurality of technicians 102 is scheduled but not dispatched and/or dispatched but not scheduled, the schedule conflict module 216 provides (at 506) an indication that at least one of the plurality of technicians 102 is scheduled but not dispatched and/or dispatched but not scheduled. In one embodiment, a numeric indication is provided showing the aggregate number of technicians 102 that are scheduled but not dispatched and technicians 102 that are dispatched but not scheduled. The numeric indication may be highlighted to distinguish between turfs 402 that have no technicians 102 that have a schedule conflict (i.e., scheduled but not dispatched and dispatched but not scheduled) and turfs 402 that have at least one technician 102 that has a schedule conflict. For example, the cell 432, which indicates that two technicians 102 have a schedule conflict, may be shaded red, while the cell 464, which indicates that no technicians 102 have a schedule conflict, may be shaded green. In one embodiment, the indication is provided in GUI, such as the GUI 400.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for providing an indication of schedule conflict, comprising:
displaying, in a graphical user interface provided by a computer having a processor and a memory, a grid having a plurality of turfs as rows on the grid and a plurality of buckets as columns on the grid, the plurality of turfs comprising a first turf and a second turf;
displaying, in the graphical user interface, a schedule conflict column comprising a plurality of cells, each of the plurality of cells corresponding to one of the rows, the plurality of cells comprising a first cell corresponding to the first turf and a second cell corresponding to the second turf, the first cell displaying a first schedule conflict value indicating a first aggregate number of technicians assigned to the first turf who are scheduled but not dispatched, the second cell displaying a second schedule conflict value indicating a second aggregate number of technicians assigned to the second turf who are scheduled but not dispatched;

determining, by the processor, a start time of a next job for a first technician assigned to the first turf;

determining, by the processor, a start time of a next job for a second technician assigned to the second turf;

determining, by the processor, whether the first technician has yet to be dispatched to the first technician's next job within a threshold amount of time after the first start time;

determining, by the processor, whether the second technician has yet to be dispatched to the second technician's next job within the threshold amount of time after second start time;

responsive to determining that the first technician has yet to be dispatched to the first technician's next job within the threshold amount of time after the first start time, incrementing the first schedule conflict value displayed in the first cell; and responsive to determining that the second technician has yet to be dispatched to the second technician's next job within the threshold amount of time after the second start time, incrementing the second schedule conflict value displayed in the second cell.

2. The computer-implemented method of claim 1, wherein the threshold amount of time is at least thirty minutes.

3. The computer-implemented method of claim 1, further comprising:
  determining whether the first schedule conflict value is greater than zero;
  responsive to determining that the first schedule conflict value is greater than zero, displaying a first highlight in the first cell; and
  responsive to determining that the first schedule conflict value is not greater than zero, displaying a second highlight in the first cell.

4. The computer-implemented method of claim 1, further comprising:
  receiving, via the graphical user interface, a user request for additional information regarding the first schedule conflict value; and
  responsive to receiving the user request for additional information regarding the first schedule conflict value, displaying, in the graphical user interface, a drop-down window overlaid on the grid, the drop-down window comprising a first column displaying a name of the first technician and a second column displaying the first start time of the first technician's next job.

5. A system for providing an indication of schedule conflict, comprising:
  a memory for storing a program containing code for providing the indication of schedule conflict;
  a processor functionally coupled to the memory, the processor being responsive to computer-executable instructions contained in the program and operative to at least:
    display, in a graphical user interface, a grid having a plurality of turfs as rows on the grid and a plurality of buckets as columns on the grid, the plurality of turfs comprising a first turf and a second turf,
    display, in the graphical user interface, a schedule conflict column comprising a plurality of cells, each of the plurality of cells corresponding to one of the rows, the plurality of cells comprising a first cell corresponding to the first turf and a second cell corresponding to the second turf, the first cell displaying a first schedule conflict value indicating a first aggregate number of technicians assigned to the first turf who are scheduled but not dispatched, the second cell displaying a second schedule conflict value indicating a second aggregate number of technicians assigned to the second turf who are scheduled but not dispatched,
    determine a start time of a next job for a first technician assigned to the first turf;
    determine a start time of a next job for a second technician assigned to the second turf,
    determining whether the first technician has yet to be dispatched to the first technician's next job within a threshold amount of time after the first start time,
    determining whether the second technician has yet to be dispatched to the second technician's next job within the threshold amount of time after second start time,
    responsive to determining that the first technician has yet to be dispatched to the first technician's next job within the threshold amount of time after the first start time, increment the first schedule conflict value displayed in the first cell, and
    responsive to determining that the second technician has yet to be dispatched to the second technician's next job within the threshold amount of time after the second start time, increment the second schedule conflict value displayed in the second cell.

6. The system of claim 5, wherein the processor is further operative to at least:
  determine whether the first schedule conflict value is greater than zero,
  responsive to determining that the first schedule conflict value is greater than zero, display a first highlight in the first cell, and
  responsive to determining that the first schedule conflict value is not greater than zero, display a second highlight in the first cell.

7. The system of claim 5, wherein: the processor is further operative to at least:
  dispatched or dispatched but not scheduled the processor is further operative to at least: receive, via the graphical user interface, a user request for additional information regarding the first schedule conflict value, and responsive to receiving the user request for additional information regarding the first schedule conflict value, display, in the graphical user interface, a drop-down window overlaid on the grid, the drop-down window comprising a first column displaying a name of the first technician and a second column displaying the start time of the first technician's next job.

8. A computer-readable non-transitory medium having instructions stored thereon for execution by a processor to perform a method for providing an indication of schedule conflict, the method comprising:
  displaying, in a graphical user interface, a grid having a plurality of turfs as rows on the grid and a plurality of buckets as columns on the grid, the plurality of turfs comprising a first turf and a second turf;
  displaying, in the graphical user interface, a schedule conflict column comprising a plurality of cells, each of the plurality of cells corresponding to one of the rows, the plurality of cells comprising a first cell corresponding to the first turf and a second cell corresponding to the second turf, the first cell displaying a first schedule conflict value indicating a first aggregate number of technicians assigned to the first turf who are scheduled but not dispatched, the second cell displaying a second schedule conflict value indicating a second aggregate number of technicians assigned to the second turf who are scheduled but not dispatched;

determining a start time of a next job for a first technician assigned to the first turf;

determining a start time of a next job for a second technician assigned to the second turf;

determining whether the first technician has yet to be dispatched to the first technician's next job within a threshold amount of time after the first start time;

determining whether the second technician has yet to be dispatched to the second technician's next job within the threshold amount of time after second start time;

responsive to determining that the first technician has yet to be dispatched to the first technician's next job within the threshold amount of time after the first start time, incrementing the first schedule conflict value displayed in the first cell; and responsive to determining that the second technician has yet to be dispatched to the second technician's next job within the threshold amount of time after the second start time, incrementing the second schedule conflict value displayed in the second cell.

9. The computer-readable non-transitory medium of claim 8, wherein the threshold amount of time is at least thirty minutes.

10. The computer-readable non-transitory medium of claim 8, wherein the cell comprises a first highlight in response to determining that the one of the plurality of technicians is scheduled but not dispatched or dispatched but not scheduled, and wherein the cell comprises a second highlight in response to determining that none of the plurality of technicians is scheduled but not dispatched or dispatched but not scheduled the method further comprising: determining whether the first schedule conflict value is greater than zero; responsive to determining that the first schedule conflict value is greater than zero, displaying a first highlight in the first cell; and responsive to determining that the first schedule conflict value is not greater than zero, displaying a second highlight in the first cell.

11. The computer-readable medium of claim 8, the method further comprising:

receiving, via the graphical user interface, a user request for additional information regarding the first schedule conflict value; and responsive to receiving the user request for additional information regarding the first schedule conflict value, displaying, in the graphical user interface, a drop-down window overlaid on the grid, the drop-down window comprising a first column displaying a name of the first technician and a second column displaying the start time of the first technician's next job.

* * * * *